UNITED STATES PATENT OFFICE.

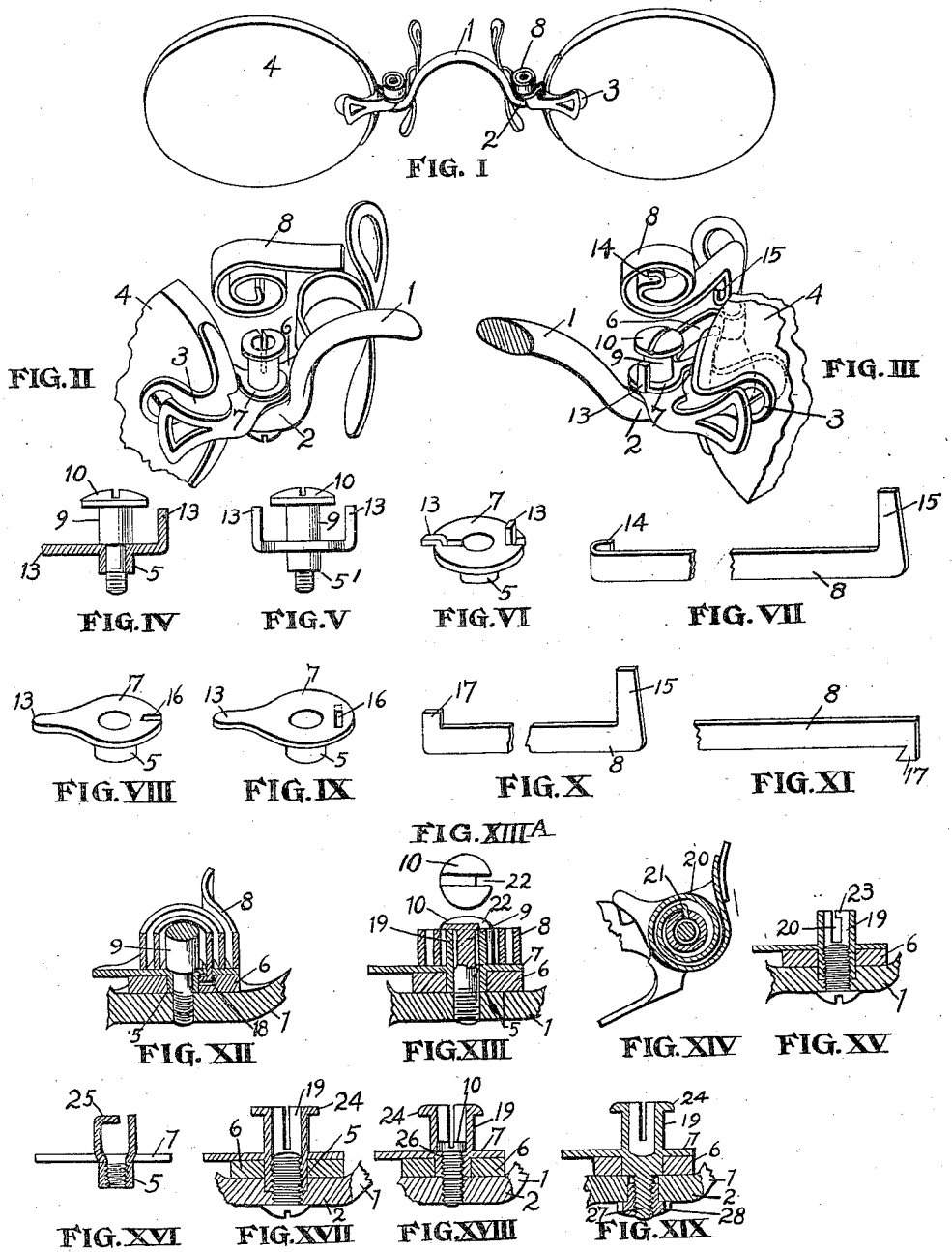

JOEL C. WELLS AND HARRY H. STYLL, OF SOUTHBRIDGE, MASSACHUSETTS; SAID STYLL ASSIGNOR TO SAID WELLS.

EYEGLASSES.

1,182,066. Specification of Letters Patent. Patented May 9, 1916.

Application filed February 29, 1912. Serial No. 680,663.

*To all whom it may concern:*

Be it known that we, JOEL C. WELLS and HARRY H. STYLL, citizens of the United States, residing at Southbridge, in the county of Worcester and State of Massachusetts, have invented certain new and useful Improvements in Eyeglasses, of which the following is a specification.

Our invention relates to improvements in eyeglasses and has particular reference to that form of eyeglasses in which the guards are carried by spring actuated levers.

The leading object of our invention is the provision in an eyeglass mounting of this character of an improved form of flat as counter-distinguished from a coil spring and of novel and improved means for anchoring one end of the said spring.

The further object of our invention is the provision of an improved combined spacing and bearing member which shall provide both a bearing for the lever and prevent weaving of the lever or undue tightening of the pivot post or screw and which member shall also serve to provide means for anchoring one end of the actuating spring for the lever.

Another object of the invention is the provision of means for so securing the actuating spring in position as to permit of the ready detachment and removal of the spring when desired without the necessity of loosening the pivot post or other securing device.

Other objects and advantages of our improved eyeglass mounting will be readily apparent by reference to the following specification taken in connection with the accompanying drawings forming a part thereof, and it will be understood that we may make any modifications in the specific details of construction shown and described within the scope of the appended claims without departing from or exceeding the spirit of our invention.

Figure I represents a perspective view of one type of eyeglass mounting equipped with our improved spring and spring anchor. Fig. II represents a fragmentary perspective view illustrating one of the forms of our invention with the parts in partially disassembled position. Fig. III represents a similar view of another form of the invention. Fig. IV represents a view partially in section of the pivot post and spring locking member as shown in Fig. III. Fig. V represents an elevation of a similar structure but formed in a single piece, the anchoring member being integral with the post and both ears being bent up to facilitate insertion of the pivot post. Fig. VI represents a perspective view of a slightly modified construction of spring anchoring member. Fig. VII represents a perspective view of the spring preferably used in connection with the foregoing bearing and anchoring members. Fig. VIII represents a perspective view of another modification of anchoring member. Fig. IX represents a further slight modification thereof. Fig. X represents a perspective view of a spring for use in connection with the bearing and anchoring members shown in Fig. VIII. Fig. XI represents a fragmentary view of the spring for use in connection with the device shown in Fig. IX. Fig. XII represents a vertical sectional view showing a slight modification of the anchoring member and spring shown in Figs. IX and XI. Fig. XIII represents a sectional view of another style of spring anchoring device particularly adapted for use when it is desired to employ a removable flat spring. Fig. XIII$^a$ represents a plan view of the head of the post shown in Fig. XIII. Fig. XIV represents a sectional plan view of the form of invention illustrated in Fig. XIII. Fig. XV represents a vertical sectional view of another modification for use in connection with a removable spring. Fig. XVI represents a view of a slightly modified construction of member for securing the removable spring in place. Fig. XVII represents a sectional view of a still further modification of the locking member. Fig. XVIII represents a vertical sectional view of a slight modification of the invention shown in Fig. XVII. Fig. XIX represents a vertical sectional view of another modification of the invention.

In the drawings, in which similar characters of reference are employed throughout the several views to denote corresponding parts, the numeral 1 designates the eyeglass bridge having the flattened portions 2 forming seats for the pivot posts, while disposed at the ends of the bridge are the clips 3 for supporting the customary lenses 4.

While we have shown our invention as applied to a finger piece mounting it will be understood that we do not wish to limit ourselves to said construction but may employ our invention in connection with any type of eyeglass embodying pivoted guard levers.

In most of the forms of our invention illustrated we have employed a washer or bushing 5 which forms a bearing for the guard lever 6, said member 5 having projecting therefrom the peripheral flange 7 which rests on the upper face of the lever and holds the lever against the bridge, the length of the portion 5 being but slightly greater than the thickness of the lever 6 so that said lever has practically no vertical play and is prevented from weaving while rotating freely on the bushing 5. The term weaving is meant to denote this tilting or tendency to vertical play of the lever on the pivot, that is to say, a movement other than that of the usual pivotal movement of the lever.

In that form of our invention illustrated in Figs. III to XII inclusive we have shown the spring 8 as encircling the upper portion of the pivot post or locking screw 9 and fitting beneath the head 10 of said screw. In Fig. V the bushing and flange are integral with said screw, the screw having the shoulder 5' for limiting its downward movement into the bridge and preventing binding of the lever, the integral structure being in all other respects similar to the two piece structure.

In that form of the invention illustrated in Figs. III, IV and V, the flange 7 has formed thereon the projecting ears or tongues 13, one of which, when the parts are in position, is so disposed as to engage the adjacent lens clip 3 to lock the flange against rotation, while the other of said ears is bent upward at right angles to the plane of the flange and serves to engage the end of the spring to lock said end in position. The end of the spring is preferably bent into a hook 14 for engaging said upstanding ear 13, the other end of the spring having a portion 15 adapted to engage and bear against the guard lever 6.

In Fig. VI we have shown a slight modification of our locking member in which the tongues 13 instead of normally projecting outward from the flange 7 are cut and bent upward from said flange, one being left standing normal to the flange while the other is bent back to lie parallel with the flange and engage the lens mounting.

In Figs. VIII and IX we have shown another embodiment of our invention in which the bushing is provided with the flange 7 having but one tongue or ear 13 for engaging the mounting, the flange being formed with a notch or recess 16, which in this case forms the spring anchor, the spring being formed with a lug 17 adapted to be seated in the recess, in Fig. X the lug being straight, while in Fig. XI the lug is in the form of a dovetail for interlocking engagement with the dovetail socket or recess which is formed in the flange 7.

In Fig. XII is shown a sectional view of a form of our device similar to that shown in Figs. VIII and IX, in this instance, however, instead of forming the lug in a dovetail it is formed into a hook which fits into the recess 16 and hooks onto the flange to securely hold the spring in position when the screw 9 is tightened, if desired the lever 6 having a slight arcuate groove 18 formed therein to receive the terminal end of the hook and permit of the flange coming close to the lever to prevent weaving of the lever.

In Figs. I, II and XIII to XIX we have illustrated certain embodiments of our invention which are particularly adapted to facilitate the removal of the actuating spring 8, in these figures the screw having either an extremely small head or being so disposed that the head will in nowise interfere with the removal of the spring.

In Fig. XIII we have shown the bushing 5 as continuing on the opposite side of the flange 7 from that on which the bearing portion 5 is disposed in the second bushing portion 19 which has a slot 20 formed therein to receive the inner end of the actuating spring 8 as is most clearly shown in Fig. XIV.

By reference to Figs. XIII and XIV it will be seen that the inner end 21 of the spring just fits into the slot 20 and beneath the head 10 of the securing screw, whereby when the spring is disengaged from the guard lever 6 the tension thereof will be decreased sufficiently to permit the coils to spread apart and the end 21 to be sprung out of the slot 20 and beyond the periphery of the screw head, when the spring may be readily slipped off without detaching the screw. If desired the screw head may have a slight notch 22 therein and the locking member may be so twisted as to bring the end 21 of the spring and the notch 22 in alinement, which will facilitate the removal of the spring, as will be readily apparent.

In Figs. XV to XIX, inclusive, we have shown the upper portion 19 of the bushing so formed as to hold the spring against accidental removal without necessitating the employment of the screw head in any way, the screw in these instances passing upward through the bridge portion 2 and being screwed into the tapped lower portion of the bushing, whereby tightening of the screw draws the lower edge of the bushing firmly against the bridge and secures the same in place. In Fig. XV we have shown the upper portion 19 of the bushing as having the slot 20 therein but as having the tongues 23 at the upper end of the slot which so projects above the end 21 of the spring as to hold said end from disengaging movement when the spring is under tension, however, it being possible to force the end 21 out of the slot 20 and then to simply slip off the spring. In Fig. XVII in place of employing this tongue 23 the terminal end of the bushing 19 has formed thereon the slight flange 24 which is just sufficient to engage and hold in place the inner coil of the spring, while in Fig. XVI we have shown two integral tongues cut from the flange 7 and bent inward to leave just space enough therebetween to receive the end 21 of the spring, one of said tongues terminating in a flange or lip 25 for holding the said end 21 in place.

In Fig. XVIII we have shown a slight variation of the structure of Fig. XVII which is also applicable to several of the other forms of our invention illustrated, this variation consisting in forming the tubular member 5—19 with an interior shoulder 26 on which the head 10 of the screw 9 rests, said screw being tightened into the bridge and serving to secure the member 5—19 in position.

In Fig. XIX we have formed integral with the lower end of the portion 5 the threaded tang 27 which passes downward through the bridge and has engaged thereon the nut 28 which serves to securely lock said tang in position, if desired the portion 5 being made solid instead of hollow to give additional strength to the structure.

From the foregoing description taken in connection with the accompanying drawings, the construction and use of the various embodiments of our invention should be readily apparent, and it will be observed that in all of the forms of our invention we employ a separating flange disposed between the guard lever and the actuating spring for said lever, which flange is provided with a portion for engaging the mounting to anchor the flange and is further formed or provided with another portion or portions adapted to engage and secure in place one end of the actuating spring for the guard lever.

It will further be observed that in all of the various forms of our invention shown that portion of the device which forms a bearing for the lever terminates in a shoulder at its lower end adapted to rest against a portion of the bridge which limits the downward movement of said device, the peripheral flange of the device thus being always at a certain predetermined distance above the bridge member, this distance being made just sufficient to permit the lever to play freely around the bearing between the flange and the bridge while the flange and bridge together so engage the lever as to prevent weaving movement thereof. Our various forms and devices consequently all provide in one and the same structure an improved bearing and spacing member which serves to absolutely prevent weaving of the lever and also serves to provide an anchoring means for one end of the actuating spring for the said lever.

We claim:

1. In an eyeglass mounting, the combination with the lens supports, of pivot posts rising therefrom and bearing finger piece levers and actuating springs for said levers, and a bushing encircling each of the pivot posts and having a circumferentially projecting flange provided with a lens support engaging portion and a second portion for detachably engaging and anchoring in position one end of the actuating spring.

2. The combination with a lens support, of a pivot carried thereby, a lever mounted on the pivot, an actuating spring encircling the pivot and having one end engaging the lever, and a bushing encircling the pivot and having a flange projecting therefrom for separating the lever and the spring, said bushing having a portion engaging the lens support to lock it against rotation and having a second portion adapted to detachably engage and anchor one end of the actuating spring.

3. In an eyeglass mounting, the combination with the lens supports, of a bushing secured thereto, a lever rotatably mounted on the bushing and bearing a guard, a laterally extending anchoring portion formed on the bushing for engaging the lens support, a spring for actuating the lever, and means formed on the bushing for locking one end of the actuating spring in position.

4. In an eyeglass mounting, the combination with lens supports, of a bushing detachably secured in position upon said supports, means for locking said bushing against rotation relative to the supports, a lever pivoted on the bushing, and a spring having one end removably but nonrotatably held in position by the bushing and having its other end engaging the lever for actuating the latter.

5. In an eyeglass mounting, the combination with the lens supports, of a bearing detachably secured to the lens supports, means for anchoring the bearing against rotation relative to the supports, a lever pivoted on the bearing, and an actuating spring for the lever having one end locked in position by the bearing, the bearing being provided with means for separating the spring and lever to prevent weaving of the lever.

6. In an eyeglass mounting, the combination with the lens supports, of a bearing removably secured to said supports, means for locking the bearing against rotation relative to the supports, a lever pivotally mounted on said bearing, and means on the bearing for securing the lever against weaving movement, said means having a portion thereof constructed to provide a spring anchor.

7. In an eyeglass mounting, the combination with the lens supports, of a bearing removably secured to said supports, said bearing having a flange thereon terminating in a support engaging portion for preventing rotation of the bearing relative to the supports, a lever pivoted on the bearing, and a portion projecting upwardly from the flange for locking one end of a removable actuating spring for the lever against rotation.

8. In an eyeglass mounting, the combination with lens supports, of a bearing secured to said supports, a lever pivotally mounted on the bearing, a flange on the bearing engaging the lever to prevent weaving movement thereof, means projecting from the flange on the opposite side from the lever bearing, a spring having one end detachably engaging said means and having the other end engaging the lever to actuate the same.

9. In an eyeglass mounting, the combination with the lens supports, of a combined bearing and spring anchoring member consisting of a flange having a bushing projecting from one side thereof, a spring anchor projecting from the opposite side thereof and having an extension adapted to engage the lens supports to lock the device against rotative movement.

10. In eyeglass mounting, the combination with the lens supports, of a guard bearing lever mounted on said supports, an actuating spring for said lever and a flange disposed intermediate the spring and the lever, said flange having portions extending in opposite directions and forming respectively a bearing for the lever and an anchor for the spring and having an extension engaging the lens supports for locking the flange and parts projecting therefrom against rotation relative to said supports.

11. The combination with lens supports including a bridge, of a bushing member mounted on the bridge, and adapted to form a bearing for a pivot lever, a lever pivotally mounted on the bushing, a flange projecting above the bearing portion and held in spaced relation relative to the bridge by said bearing portion, the space between the bridge and the said flange being just sufficient to permit of pivotal movement of the lever therebetween while preventing weaving of the lever, a frame engaging portion carried by the flange for locking the same against rotation, and an actuating spring mounted upon the flange and having one end held in place thereby and the other end engaging the lever.

12. The combination with a bridge, of a removable pivot bearing rising therefrom, a lever pivotally mounted on the bearing, means on the bearing for limiting upward movement of the lever, said means being formed with frame engaging and spring engaging portions, and an independently removable actuating spring for the lever mounted upon said means and having one end interlocking with and anchored against rotation by said means.

13. The combination with a support having a lever pivoted thereon, of a bushing carried by the pivot, said bushing having a laterally projecting flange, said flange having a lateral extension for locking the same against rotation, an actuating spring for the lever and an eye on one of the two last named parts and a projection on the other for securing one end of the spring in position.

14. The combination with a support, of a spacing member having one end bearing thereagainst, a lever pivoted on the spacing member, a flange carried by the spacing member and resting on the lever, said flange having a lateral extending portion interlocking with the support for preventing relative rotation of the support and flange, a spring centering device projecting above the flange, a spring coiled around said device and having one end engaging the lever for actuating the same, and interlocking means on the flange and spring for securing the inner end of the spring.

In testimony whereof we affix our signatures in presence of two witnesses.

JOEL C. WELLS.
HARRY H. STYLL.

Witnesses:
REGINALD H. WATERS,
ALICE M. HOAR.

Copies of this patent may be obtained for five cents each, by addressing the "Commissioner of Patents, Washington, D. C."